United States Patent
Johnston et al.

(10) Patent No.: US 10,650,326 B1
(45) Date of Patent: May 12, 2020

(54) DYNAMICALLY OPTIMIZING A DATA SET DISTRIBUTION

(71) Applicant: Groupon, Inc., Chicago, IL (US)

(72) Inventors: David Alan Johnston, Portola Valley, CA (US); Jonathan Esterhazy, San Francisco, CA (US); Gaston L'Huillier, San Francisco, CA (US); Hernan Enrique Arroyo Garcia, Mountain View, CA (US)

(73) Assignee: GROUPON, INC., Chicago, IL (US)

( * ) Notice: Subject to any disclaimer, the term of this patent is extended or adjusted under 35 U.S.C. 154(b) by 954 days.

(21) Appl. No.: 14/817,005

(22) Filed: Aug. 3, 2015

Related U.S. Application Data (60) Provisional application No. 62/055,958, filed on Sep. 26, 2014, provisional application No. 62/039,314, filed on Aug. 19, 2014.

(51) Int. Cl.
*G06N 20/00* (2019.01)
*G06N 5/02* (2006.01)
*G06F 16/23* (2019.01)
*G06F 16/28* (2019.01)

(52) U.S. Cl.
CPC ............. *G06N 20/00* (2019.01); *G06F 16/23* (2019.01); *G06F 16/285* (2019.01); *G06N 5/02* (2013.01)

(58) Field of Classification Search
CPC ...... G06N 99/005; G06N 5/025; G06N 7/005; G06K 9/6256; G06K 9/6269
USPC .......................................................... 706/12
See application file for complete search history.

(56) References Cited

U.S. PATENT DOCUMENTS

| | | | |
|---|---|---|---|
| 5,825,646 A | 10/1998 | Keeler et al. | |
| 5,826,240 A | 10/1998 | Brockman et al. | |
| 5,826,249 A | 10/1998 | Skeirik | |
| 6,092,072 A * | 7/2000 | Guha ..................... | G06K 9/622 |
| | | | 707/700 |
| 7,418,431 B1 * | 8/2008 | Nies ....................... | G06F 16/972 |
| | | | 706/21 |
| 7,480,640 B1 | 1/2009 | Elad et al. | |
| 7,512,582 B2 | 3/2009 | Cao et al. | |
| 7,925,620 B1 * | 4/2011 | Yoon .................... | G06Q 10/109 |
| | | | 707/609 |
| 8,112,421 B2 | 2/2012 | Sun et al. | |
| 8,402,543 B1 | 3/2013 | Ranjan et al. | |
| 8,620,842 B1 * | 12/2013 | Cormack ............... | G06N 20/00 |
| | | | 706/12 |

(Continued)

OTHER PUBLICATIONS

Whang et al.—"Entity Resolution with Iterative Blocking"—2009—https://dl.acm.org/citation.cfm?id=1559870 (Year: 2009).*

(Continued)

*Primary Examiner* — Eric Nilsson
*Assistant Examiner* — Viker A Lamardo
(74) *Attorney, Agent, or Firm* — Alston & Bird LLP (57) ABSTRACT

In general, embodiments of the present invention provide systems, methods and computer readable media configured to receive configuration data describing a desired data set distribution, and, in response to receiving new data instances, use the configuration data and the new data instances to dynamically optimize the distribution of data already stored in a data reservoir that has been discretized into bins representing the desired data distribution.

36 Claims, 5 Drawing Sheets

(56) References Cited

U.S. PATENT DOCUMENTS

| | | | |
|---|---|---|---|
| 8,843,427 | B1 | 9/2014 | Lin et al. |
| 9,390,112 | B1* | 7/2016 | Daly .................. G06N 20/00 |
| 2003/0130899 | A1 | 7/2003 | Ferguson et al. |
| 2003/0236691 | A1 | 12/2003 | Casatl et al. |
| 2004/0049473 | A1* | 3/2004 | Gower .................. G06Q 10/04 706/46 |
| 2004/0205482 | A1 | 10/2004 | Basu et al. |
| 2005/0049990 | A1 | 3/2005 | Milenova et al. |
| 2006/0259197 | A1 | 11/2006 | Boe et al. |
| 2007/0282766 | A1 | 12/2007 | Hartman et al. |
| 2008/0147574 | A1 | 6/2008 | Chidlovskii |
| 2009/0119268 | A1* | 5/2009 | Bandaru ............. G06F 17/2745 705/7.12 |
| 2009/0193328 | A1* | 7/2009 | Reis ....................... G06F 16/345 715/231 |
| 2011/0191335 | A1* | 8/2011 | Miller ...................... G06F 16/94 707/728 |
| 2011/0313977 | A1* | 12/2011 | Al-Kateb ............... G01D 21/00 707/688 |
| 2012/0054184 | A1 | 3/2012 | Masud et al. |
| 2012/0054226 | A1* | 3/2012 | Cao ........................ G06F 16/34 707/769 |
| 2012/0254186 | A1* | 10/2012 | Winner ............... G06F 16/9537 707/740 |
| 2012/0284213 | A1 | 11/2012 | Lin et al. |
| 2012/0303555 | A1 | 11/2012 | Yakout et al. |
| 2013/0198119 | A1* | 8/2013 | Eberhardt, III ........ G06N 20/00 706/12 |
| 2013/0246315 | A1* | 9/2013 | Joshi ........................ G06N 5/04 706/10 |
| 2013/0279795 | A1* | 10/2013 | Shlain .................. G06T 7/0004 382/149 |
| 2014/0101544 | A1* | 4/2014 | Albrecht ............... G06F 17/278 715/273 |
| 2014/0129261 | A1* | 5/2014 | Bothwell ............... G06N 20/00 705/4 |
| 2014/0172767 | A1 | 6/2014 | Chen et al. |
| 2014/0279716 | A1* | 9/2014 | Cormack ............... G06N 20/00 706/10 |
| 2014/0279745 | A1* | 9/2014 | Esponda ................ G06N 5/043 706/12 |
| 2014/0297570 | A1 | 10/2014 | Garera et al. |
| 2015/0161386 | A1* | 6/2015 | Gupta .................. G06F 11/3612 726/23 |
| 2015/0356451 | A1* | 12/2015 | Gupta .................... G06N 20/00 706/52 |
| 2016/0034809 | A1* | 2/2016 | Trenholm ........... H04L 41/5041 706/20 |
| 2016/0071023 | A1* | 3/2016 | Eicher .................... G06N 20/00 706/12 |
| 2016/0331233 | A1 | 11/2016 | Mensinger et al. |

OTHER PUBLICATIONS

U.S. Appl. No. 14/918,362, filed Oct. 20, 2015.
U.S. Appl. No. 14/578,210, filed Dec. 19, 2014.
U.S. Appl. No. 14/578,205, filed Dec. 19, 2014.
U.S. Appl. No. 14/578,200, filed Dec. 19, 2014.
U.S. Appl. No. 14/578,192, filed Dec. 19, 2014.
Tong, et al., "Support Vector Machine Active Learning with Applications to Text Classification," Journal of Machine Learning Research, pp. 45-66, (2001).
Settles, "Active Learning Literature Survey," Computer Sciences Technical Report 1648, University of Wisconsin-Madison, 52.55-56 (2010): 11.
Settles, "Active Learning Literature Survey," Computer Sciences Technical Report 1648, University of Wisconsin-Madison, (2009).
Brinker, "Incorporating Diversity in Active Learning with Support Vector Machines," Proceedings of the Twentieth International Conference on Machine Learning (ICML—2003), (2003).
Basu, et al., "Active Semi-Supervision for Pairwise Constrained Clustering," Proceedings of the SIAM International Conference on Data Mining (SDM—2004), Society for Industrial and Applied Mathematics, pp. 333-344, (2004).
North, H. et al., "Classifying agricultural land uses with time series of satellite images," 2012 IEEE Inti. Geoscience and Remote Sensing Symp. (IGARSS 2012) pp. 5693-5696.
Mao, C.-H. et al., "Semi-supervised Co-training and Active Learning based Approach for Multi-view Intrusion Detection," Proc. of the 2009 ACM Symp. on Applied Computing (2009) pp. 2042-2048.
Kayacik, H. et al., "Selecting features for intrusion detection: A feature relevance analysis on KDD 99 intrusion detection datasets," Proc. of the 3rd Annual Conf. on Privacy, Security, and Trust (2005) 6 pp.
Javani, M. et al., "Clustering and feature selection via PSO algorithm," 2011 Inti. Symp. on Artificial Intelligence and Signal Processing (AISP 2011) pp. 71-76.
Transfer Learning by Finetuning Pretrained CN Ns Entirely with Synthetic Images, Param Rajpura 1 Alakh Aggarwal, Manik Goyal, Sanchit Gupta , Jonti Talukdar, Hristo Bojinov, and Ravi Hegde Indian Institute of Technology Gandhinagar, Gandhinagar 382355, India 2018 pp. 517-528.
ACM Digital Library Beyond myopic inference in big data pipelines, Karthik Raman, Adith Swaminathan, Johannes Gehrke, Thorsten Joachims, Proceeding KDD '13 Proceedings of the 19th ACM SIGKDD international conference on Knowledge discovery and data mining pp. 86-94 Aug. 11-14, 2013.
ACM Digital Library a Review of User Interface Design for Interactive Machine Learning, John J. Dudley & Per Ola Kristensson, Journal ACM Transactions on Interactive Intelligent Systems (TiiS)—Special Issue on Human-Centered Machine Learning archive vol. 8 Issue 2, Jul. 2018, pp. 1-37.
Lewis, D. et al., "RCV1: A new benchmark collection for Text Categorization Research" Journal of Machine Learning Research, vol. 5 (2004) pp. 361-397. (Year: 2004).
Joshi, A. et al., "Mutli-class active learning for image classification," Mitsubishi Electric Research Laboratories Technical Report TR-2009-034 (2009) 10 pp. (Year: 2009).
Dredze, M. et al., "Confidence-weighted linear classification," Proc. of the 25th Inti. Conf. on Machine Learning (2008) 8 pp. (Year: 2008).
Dredze, M. et al., "Active learning with confidence," Proc. of ACL-08:HTL, Short Papers (2008) pp. 233-236. (Year: 2008).
"Arnold: Declarative Crowd-Machine Data Integration1": Jeffery, 2013.

\* cited by examiner

DYNAMICALLY OPTIMIZING A DATA SET DISTRIBUTION

CROSS-REFERENCE TO RELATED APPLICATIONS

This application claims the benefit of U.S. Provisional Application No. 62/055,958, entitled "DYNAMICALLY OPTIMIZING A DATA SET DISTRIBUTION," and filed Sep. 26, 2014, and of U.S. Provisional Application No. 62/039,314, entitled "DYNAMICALLY OPTIMIZING A DATA SET DISTRIBUTION," and filed Aug. 19, 2014, of which the entire contents of both are hereby incorporated by reference.

FIELD

Embodiments of the invention relate, generally, to dynamic optimization of a data set distribution.

BACKGROUND

A classifier is an example of an algorithm that may be derived using supervised machine learning. In order to make accurate predictions, supervised machine learning classifiers are derived through training using a set of labeled data examples. In modeling a classification problem in which the classifier must make a categorical prediction, the training data set should contain many labeled examples of each possible category to ensure that the classifier will make accurate predictions for new input examples that might fall into one of the categories.

A common way to improve a classifier's prediction performance is to sample a labeling data set from the general population, obtain true labels for the labeling set, and add these labels to the training set used to derive the classifier. For some classification problems in which instances of one or more of the classification categories are relatively rare (e.g., predicting gene mutations, earthquakes, or ad click throughs), the distribution in the general population of the true labels is skewed in favor of the most commonly occurring instances. If naïve (random) sampling from a general population were used to generate a labeling set, it is likely that the labeling set, after being labeled, also will have a skewed distribution of labels. A skewed distribution of labels may not add much support to the model to make predictions for rare events.

Current methods for dynamic optimization of a data set distribution exhibit a plurality of problems that make current systems insufficient, ineffective and/or the like. Through applied effort, ingenuity, and innovation, solutions to improve such methods have been realized and are described in connection with embodiments of the present invention.

SUMMARY

In general, embodiments of the present invention provide herein systems, methods and computer readable media configured to receive configuration data describing a desired data set distribution, and, in response to receiving new data instances, use the configuration data and the new data instances to dynamically optimize the distribution of data already stored in a data reservoir that has been discretized into bins representing the desired data distribution.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

The present invention now will be described more fully hereinafter with reference to the accompanying drawings, in which some, but not all embodiments of the invention are shown. Indeed, this invention may be embodied in many different forms and should not be construed as being limited to the embodiments set forth herein; rather, these embodiments are provided so that this disclosure will satisfy applicable legal requirements. Like numbers refer to like elements throughout.

As described herein, system components can be communicatively coupled to one or more of each other. Though the components are described as being separate or distinct, two or more of the components may be combined into a single process or routine. The component functional descriptions provided herein including separation of responsibility for distinct functions is by way of example. Other groupings or other divisions of functional responsibilities can be made as necessary or in accordance with design preferences.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data may be received directly from the another computing device or may be received indirectly via one or more intermediary computing devices, such as, for example, one or more servers, relays, routers, network access points, base stations, and/or the like. Similarly, where a computing device is described herein to send data to another computing device, the data may be sent directly to the another computing device or may be sent indirectly via one or more intermediary computing devices, such as, for example, one or more servers, relays, routers, network access points, base stations, and/or the like.

Entity resolution is an example of a categorical classification problem for which the accuracy of the predictions made by a classifier derived using supervised machine learning requires a training data set having a balanced class distribution. In entity resolution, a classifier is trained to return "match" or "no match" in response to receiving a pair of input examples. In entity resolution, a reference is a description of an entity, which is a real-world object. A reference may be a listing in a database or a list (which may contain some duplicate entries). Multiple references may describe the same entity. A labeling set example is a pair of references, and a label is either "match" or "no match."

Given a list of references of size n, potentially comparing every reference to every other reference would result in making n^2 comparisons. Of those comparisons, the expectation is to see O(n^2) non-matches and O(n) matches (assuming the list has some duplicate references, but is not all duplicate references). Therefore, the set of possible labeling examples from which to draw a training data set for an entity resolution classifier is heavily skewed towards non-matches. As previously described, if a labeling set were generated from a general population using naïve (random) sampling, it is likely that the labeling set, after being labeled, would have a distribution of labels skewed towards "no match." A labeling set containing such a skewed distribution of labels may not add much support to the entity resolution model for making accurate predictions for the rare "match" events.

In embodiments, a declarative system for dynamic data distribution optimization (i.e., the system receives a configuration for collecting data samples, the configuration specifying a particular data sample distribution to be satisfied over time) enables selection of a labeling set that, added to a training data set, will optimally improve the performance of a machine learning algorithm derived from that training data set. In embodiments, dynamic data distribution optimization may improve classifier performance for the specific entity resolution case where non-matches are much more frequent than matches, as well as for any categorical classification model based on a general population with rare target variables.

Figure 1:
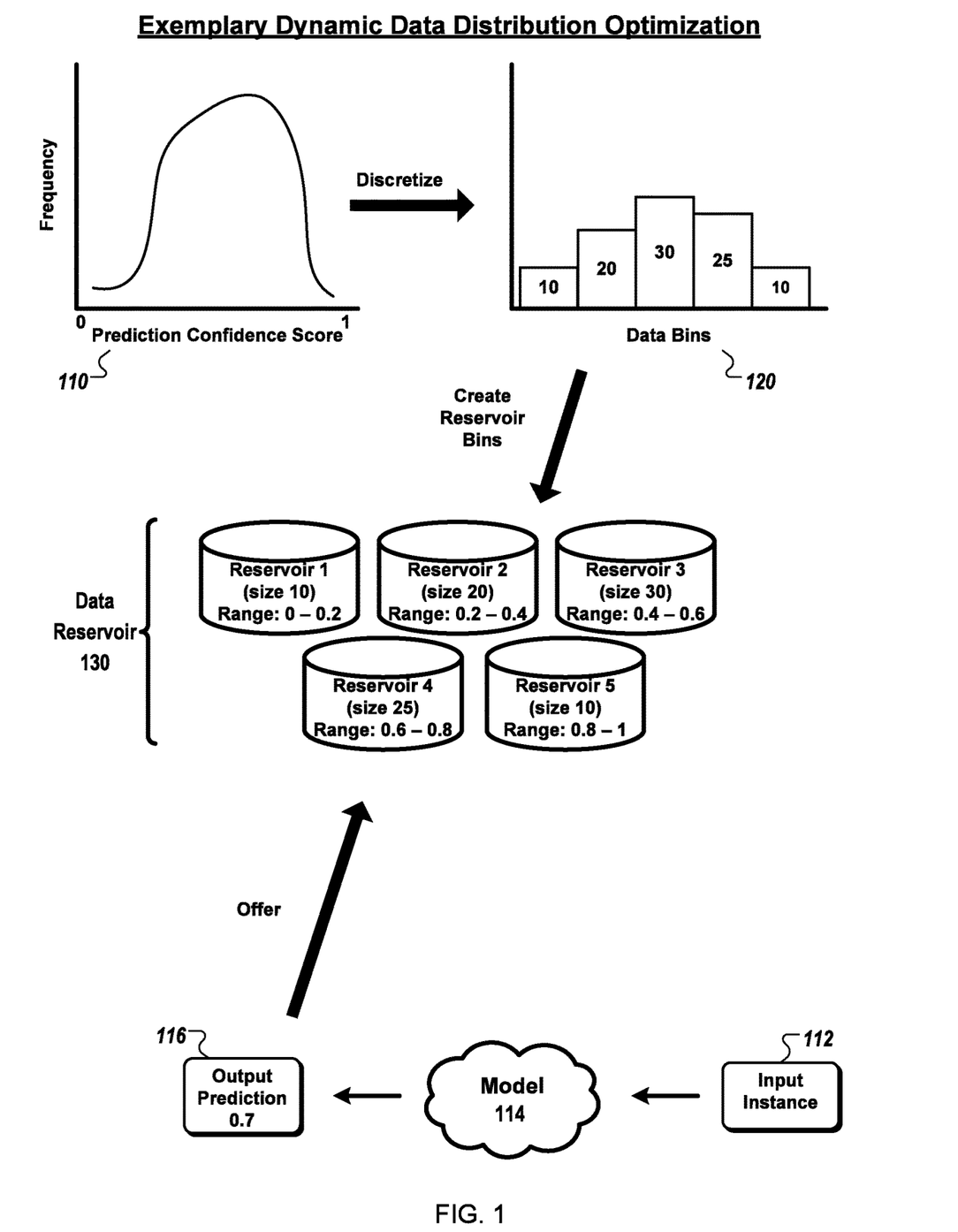
FIG. 1 illustrates an exemplary dynamic data distribution optimization scenario according to various embodiments of the invention in accordance with some embodiments discussed herein.

FIG. 1 illustrates an exemplary dynamic data distribution optimization scenario according to various embodiments of the invention. The scenario is described for clarification and without limitation.

In embodiments, the output of a classifier predictive model in response to a new input example may include the prediction (e.g., "match" or "no match" for an entity resolution classification problem) as well as a prediction confidence value. In some embodiments, the prediction confidence value is a probability score between 0 and 1 that represents the distance between the value on which the prediction is based and the distance between that value and the decision boundary in decision space. The closer a prediction value is to the decision boundary, the lower the prediction confidence score.

In some embodiments, an active learning component may facilitate adaptation of a predictive model. Active learning, as described, for example, in Settles, Burr (2009), "Active Learning Literature Survey", Computer Sciences Technical Report 1648. University of Wisconsin-Madison, is semi-supervised learning, in which the distribution of samples composing a training data set can be adjusted to optimally represent a machine learning problem by interactively querying a source of truth (e.g., an oracle) to assign labels to new data samples that are to be added to the training data set.

In reference to the example, a desired prediction accuracy of a classifier, represented by a distribution 110 of prediction confidence scores (in this case, a normal distribution), is discretized into a set of data bins 120. Each of the data bins is a reservoir for storing input data instances that each generates a prediction associated with a confidence score that falls within a respective range of confidence scores. Each bin also has a reservoir size capacity, represented on the bar graph as a maximum number of input instances to be stored within the bin. In embodiments, the choice of the number of data bins and their relative capacities may be expressed as a configuration parameter representing a training data set distribution that is desired for a particular classification problem. For example, if the machine learning model is a binary classifier, a configuration parameter may specify a distribution of 50% predicted matches, 50% predicted non-matches. If the machine learning model is a probabilistic estimator, a configuration parameter may specify a Gaussian distribution of predicted probabilities that are centered around the confidence score of 0.5.

In embodiments, the set of reservoir bins may be used as a data reservoir 130 for maintaining a random sample of a population representing a particular classification problem. In some embodiments, the data reservoir 130 may be a "hopper" of interesting data points. In embodiments, the reservoir data sample may be selected from a data stream. In some embodiments, the data stream may be received from an online data processing system. In some alternative embodiments, the data stream may be generated from a very large data store.

In embodiments in which the sample in the data reservoir is selected from a data stream, the sample may be a temporally unbiased sample, in which the first data point that flows through the stream is equally likely to end up in the sample as the last (or any points in between). In some embodiments, a temporally unbiased sample may be selected from a data stream using a well-known technique called reservoir sampling. In embodiments, the sample in the data reservoir is selected such that the distribution of the target variable as predicted by the existing machine learning algorithm satisfies the desired distribution for the classification problem. Referring to the exemplary scenario, a model 114 generates an output prediction 116 with a confidence score of 0.7 for a particular input instance 112. The input instance 112 and its output 116 are offered to reservoir bin 4, which stores data instances for which the model 114 has generated predictions with confidence scores within the range of 0.6 to 0.8. In some embodiments, each data reservoir bin may be associated with a reservoir sampler that determines whether to update the reservoir bin using an offered input instance 112. Reservoir samplers will be described in more detail with reference to FIG. 2.

As such, and according to some example embodiments, the systems and methods described herein are therefore configured to receive configuration data describing a desired data set distribution, and, in response to receiving new data instances, use the configuration data and the new data instances to dynamically optimize the distribution of data already stored in a data reservoir that has been discretized into bins representing the desired data distribution.

Figure 2:
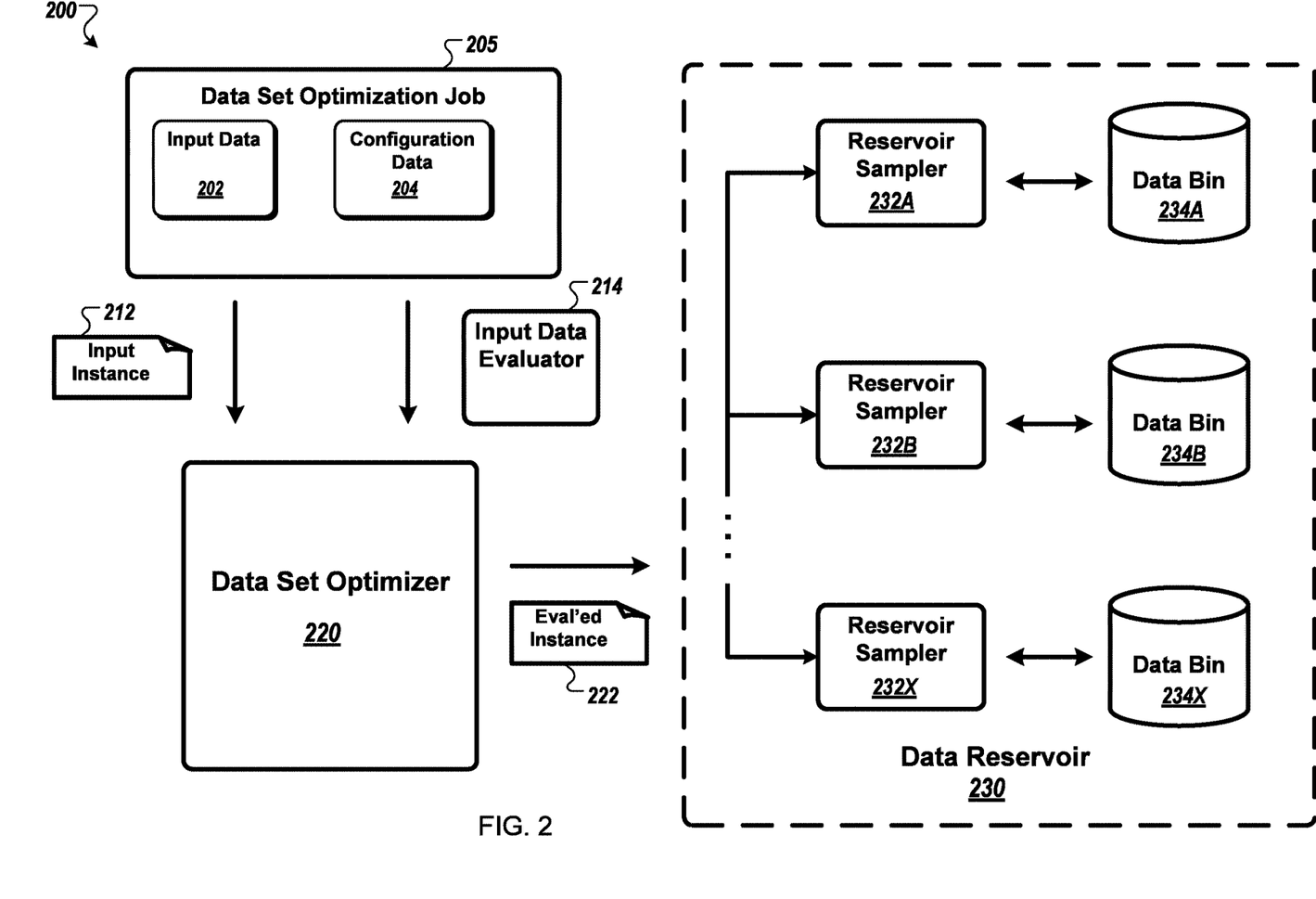
FIG. 2 illustrates an example system that can be configured to implement dynamic optimization of a data set distribution in accordance with some embodiments discussed herein.

FIG. 2 illustrates an example system 200 that can be configured to implement dynamic optimization of a data set distribution. In embodiments, system 200 may include a data reservoir 230 that has been discretized into multiple data bins (234A, 234B, . . . , 234X) based on a desired overall statistical distribution of data in the reservoir 230; and a data set optimizer 220 that automatically maintains a fresh, up-to-date data reservoir 230 with the desired distribution by receiving newly collected data and then determining whether to update the data reservoir 230 using the newly collected data.

In embodiments, the system 200 receives a data set optimization job 205 that includes input data 202 and configuration data 204. In some embodiments, the input data set 202 may be a data stream, as previously described. In some embodiments, the configuration data 204 may include a description of the discretized data reservoir 230 (e.g., the configuration of the set of bins and, additionally and/or alternatively, a desired distribution of data across the set of bins). In some embodiments, the data set optimization job 205 also may include an input data evaluator 214 while, in some alternative embodiments, the input data evaluator 214 may be a component of system 200. In embodiments, the input data evaluator 214 may be a supervised machine learning algorithm (e.g., a classifier). In some embodiments, evaluating an input data instance may include assigning the instance an evaluation value (e.g., a classification prediction confidence value as previously described with reference to FIG. 1).

In some embodiments, each of the input data instances 212 from the input data set 202 is processed by the data set optimizer 220 using the input data evaluator 214, and then the system determines whether the evaluated data instance 222 is to be offered to any of the data bins 234 in the data reservoir 230. In some embodiments, the evaluated data instance 222 includes a prediction and/or prediction confidence value, and the determination is based at least in part on matching the prediction and/or prediction confidence value to attributes of the data that are respectively stored within each data bin 234.

In some embodiments, each of the data bins 234 is respectively associated with a reservoir sampler 232 that maintains summary statistics of the distribution of data within the bin and determines whether to update the data bin 234 based in part on those summary statistics. For example, in some embodiments, the summary statistics may include a size capacity for the data bin 234 (i.e., the maximum number of data instances that can be stored in the data bin) since the set of data bins is selected to represent a discretized overall distribution of the data reservoir 230. Additionally, each of the data bins 234 may be associated with a particular range of evaluation values. Thus, in some embodiments, a reservoir sampler 232 may determine that an evaluated data instance 222 is to be added to a data bin 234 if the evaluation value associated with the data instance is within the range of evaluation values associated with the bin and if the current bin size is below the bin size capacity. Additionally and/or alternatively, a reservoir sampler 232 may determine that adding an evaluated data instance 222 to a data bin 232 will replace a data instance that currently is stored in the data bin 232.

Figure 3:
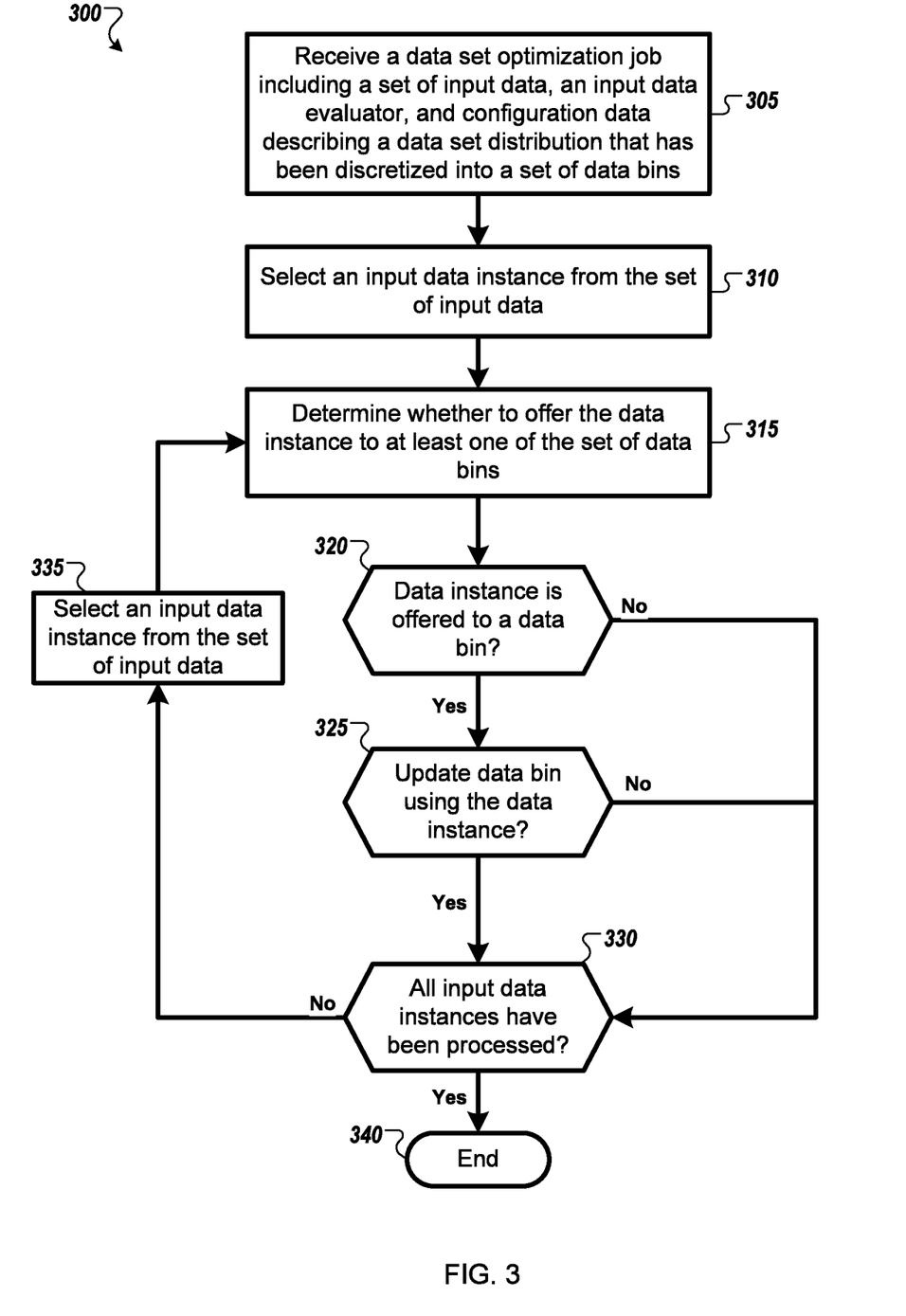
FIG. 3 is a flow diagram of an example method for optimizing a data set distribution in accordance with some embodiments discussed herein.

FIG. 3 is a flow diagram of an example method 300 for optimizing a data set distribution. Specifically, the method 300 is described with respect to processing of a data set optimization job 205 by system 200.

In embodiments, the system receives 305 a data set optimization job that may include a set of input data, configuration data describing a data set distribution that has been discretized into a set of data bins, and an input data evaluator. In some embodiments, the set of input data may be a data stream that is received from an online data processing system. In some alternative embodiments, the set of input data may be a data stream that is generated from a very large data store that contains more data than can be analyzed at once. In some embodiments, the input data evaluator may be a supervised machine learning algorithm (e.g., a classifier).

In embodiments, the system selects 310 an input data instance from the set of input data, and then determines 315 whether to offer the data instance to at least one of the set of data bins. In some embodiments, as described with reference to FIG. 2, the system uses the received input data evaluator to evaluate the input data instance. In some embodiments, the input data evaluator may be a supervised machine learning algorithm (e.g., a classifier). In some embodiments, the evaluated data instance includes a prediction and/or prediction confidence value, and the determination 315 whether to offer the data instance to at least one of the set of data bins is based at least in part on matching the prediction and/or prediction confidence value to attributes of the data that are respectively stored within each data bin.

In an instance 320 in which the data instance is offered to a data bin, the system determines 325 whether to update the data bin using the data instance. In some embodiments, as described with reference to FIG. 2, determining whether to update a data bin is implemented by a reservoir sampler respectively associated with that data bin. In some embodiments, the reservoir sampler maintains summary statistics of the distribution of data within the data bin and determines whether to update the data bin based in part on those summary statistics. In an instance in which the data bin is updated 325, in some embodiments, the system may add the evaluated data instance to the data bin and/or replace a data instance currently stored in the data bin with the evaluated data instance.

The system processes each input data instance received in the data set optimization job. The process ends 340 in an instance in which the system determines 330 that all the input data instances have been processed. In an instance 330 in which all the input data instances have not been processed, the system selects 335 another input data instance to process from the set of input data.

In some embodiments in which the system is an entity resolution sampling system, the received set of input data are entity references (some of which may refer to the same entity, as previously described), and the input data evaluator is a machine learning algorithm that evaluates each possible pair of references as either being a match or not being a match. Thus, prior to evaluation, a received set of input data explodes into a large data space of possible reference pairs for the system to process (e.g., an input list of N=100,000 references explodes to $N^2$=10 billion possible pairs).

Searching through 10 billion pairs for less than 100,000 matching references may be computationally expensive. In some embodiments, selection of reference pairs to input to a predictive model for entity resolution may be optimized by first converting a list of references into a data stream of pairs of references. Thus, entity resolution sampling is converted from list processing to a stream sampling problem. There are a variety of different approaches to schedule the addition of pairs of references to a data stream. Table 1 illustrates, for clarity and without limitation, a pseudocode implementation of one example approach in which pairs of references are added to the data stream according to a random schedule.

TABLE 1

Exemplary random selection of input data instances
for entity resolution sampling

```
while (true):
    reference1 = choose_randomly_from_input_list (input_list)
    reference2 = choose_randomly_from_input_list (input_list)
    if reference1 != reference2:
        emit ( new Pair (reference1, reference2) )
```

In some embodiments, selecting a set of input data instances may be further optimized to increase search efficiency. For example, in some embodiments, selecting a set of input data instances may include partitioning the input references by a grouping function to create pre-defined groupings of references that are more likely to match, and then calculating the proportion of references that exist in each group (in entity resolution, this approach is called "blocking."). In an example embodiment, geospatial data may be grouped into latitude/longitude "squares." Inside each square, the geospatial data will be in close geographical proximity, and thus may have a higher likelihood of matching together. Other exemplary grouping fields for geographical data may include city and/or postal code.

An exemplary pseudocode implementation of optimized selection of input data for entity resolution sampling by using a grouping function is described in Table 2.

TABLE 2

Exemplary data stream preprocessing using a grouping function

```
while (true):
    group =
    choose_a_group_randomly_according_to_group_proportions
    (group_proportions)
        reference1 = choose_randomly_from_group (group)
        reference2 = choose_randomly_from_group (group)
        if reference1 != reference2:
            emit ( new Pair (reference1, reference2) )
```

In some embodiments, an adaptive data analysis system that includes a predictive model may be configured to further include an active learning component to facilitate adaptation of the predictive model. In embodiments, a dynamic data set distribution system (e.g., system 200) may complement an active learning component by facilitating selection of a labeling set of samples that will optimally improve the performance of the predictive model.

Figure 4:
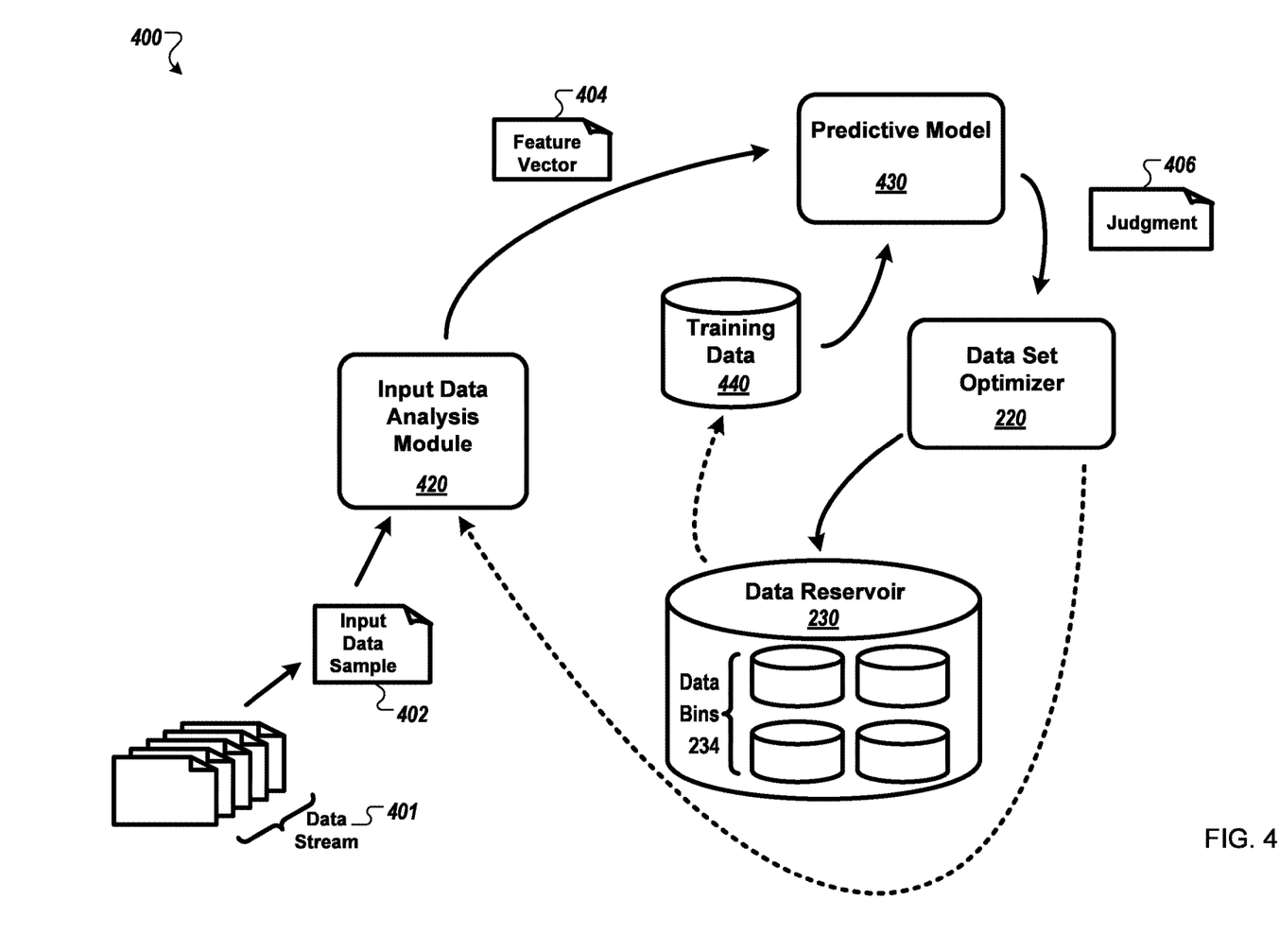
FIG. 4 illustrates an example adaptive data analysis system that is configured to include dynamic data set distribution optimization in accordance with some embodiments discussed herein.

FIG. 4 illustrates an example adaptive online data analysis system 400 that is configured to include dynamic data set distribution optimization according to various embodiments of the invention. In embodiments, system 400 may comprise an input data analysis module 420 for creating an optimal feature representation (e.g., a feature vector 404) of a received input data sample 402 selected from a data stream 401; a predictive model 430 that has been generated using machine learning based on a set of training data 440, and that is configured to generate a judgment 406 about the input data sample 402 in response to receiving a feature vector 404 representing the input data sample 402; a data set optimizer 220 for evaluating the input data sample 402 and its associated judgment 406; and a data reservoir 230 that includes a set of data bins 234 maintained by data set optimizer 220. The data reservoir 230 thus is ensured to store fresh, up-to-date data that, in embodiments, may be selected from at least one of the bins 234 to update the training data 440, thus enabling the model to be improved incrementally by being re-trained with a currently optimal set of examples.

In embodiments, the configuration of the reservoir data bins 234 may be used to ensure that the data reservoir stores up-to-date samples in a distribution that, if samples were selected from the bins and used to update the training data 440, those samples potentially would create training data that would improve the performance of the predictive model 430. In a first example, a set of bins 234 may be used to generate labeling sets that don't match the distribution of the general population. Each of the bins may be used to store data representing one of the possible labels, and a labeling set with equal frequencies of samples of each label may be generated even though at least one of the labels may be rare in the general population distribution. In a second example, each of the bins may represent one of the sources that have contributed to the data stream, and training data may be selected from the bins to match a distribution that represents a particular machine learning problem. Thus, if each of the data sources is a particular location (e.g., the US, Europe, and Asia), each of the bins stores data samples selected from one of the sources, and the desired training data 440 distribution should represent 10% US sources, 10% of a labeling sample may be selected from the data bin storing data selected from US sources.

In some embodiments, dynamic data set distribution optimization may be used as an anomaly detection system to support the quality assurance of data flowing through a real time data processing system. In these embodiments, for example, system 400 may be configured to include an anomaly scorer instead of a predictive model 430, and the data bins 234 would be configured to represent a distribution of anomaly scores.

In some embodiments, dynamic data set distribution optimization may be used to assess the predictive model 430 calibration. In a perfectly calibrated model, the model predictions exactly match reality. Thus, for example, if the model is a probabilistic estimator, the model should predict 50% yes and 50% no for a probability 0.5; the model should predict 30% yes and 70% no for a probability 0.7; and the like. The empirical distribution within each data bin may be used to test the extent of the model 430 calibration. A small sample of data may be pulled out of a bin for analysis, and the distribution of predictions in the sample may be used for the test. For example, if the data in the bin represent a probability of 0.1, the data distribution may be tested to determine if 10% of the predictions in the sample match that probability.

In some embodiments, dynamic data set distribution optimization may be used to optimize feature modeling. The accuracy of the decisions within a bin may be tested (e.g., in some embodiments, a sample of the decisions within a bin may be sent to a crowd for verification), and the results may be used to adjust the feature modeling performed by the input data analysis module 420.

Figure 5:
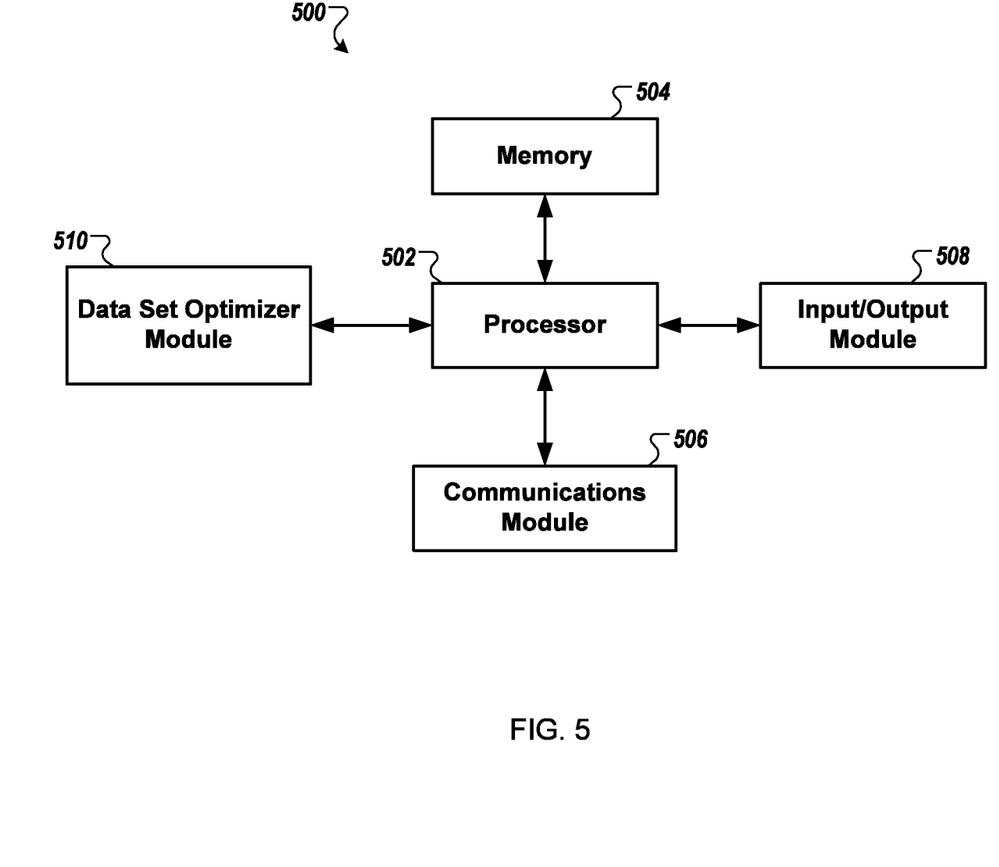
FIG. 5 illustrates a schematic block diagram of circuitry that can be included in a computing device, such as a dynamic data set distribution optimization system, in accordance with some embodiments discussed herein.

FIG. 5 shows a schematic block diagram of circuitry 500, some or all of which may be included in, for example, dynamic data set distribution optimization system 200. As illustrated in FIG. 5, in accordance with some example embodiments, circuitry 500 can include various means, such as processor 502, memory 504, communications module 506, and/or input/output module 508. As referred to herein, "module" includes hardware, software and/or firmware configured to perform one or more particular functions. In this regard, the means of circuitry 500 as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 504) that is executable by a suitably configured processing device (e.g., processor 502), or some combination thereof.

Processor 502 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 5 as a single processor, in some embodiments processor 502 comprises a plurality of processors. The plurality of processors may be embodied on a single computing device or may be distributed across a plurality of computing devices collectively configured to function as circuitry 500. The plurality of processors may be in operative communication with each other and may be collectively configured to perform one or more functionalities of circuitry 500 as described herein. In an example embodiment, processor 502 is configured to execute instructions stored in memory 504 or otherwise accessible to processor 502. These instructions, when executed by processor 502, may cause circuitry 500 to perform one or more of the functionalities of circuitry 500 as described herein.

Whether configured by hardware, firmware/software methods, or by a combination thereof, processor 502 may comprise an entity capable of performing operations according to embodiments of the present invention while configured accordingly. Thus, for example, when processor 502 is embodied as an ASIC, FPGA or the like, processor 502 may comprise specifically configured hardware for conducting one or more operations described herein. Alternatively, as another example, when processor 502 is embodied as an executor of instructions, such as may be stored in memory 504, the instructions may specifically configure processor 502 to perform one or more algorithms and operations described herein, such as those discussed in connection with FIGS. 2-4.

Memory 504 may comprise, for example, volatile memory, non-volatile memory, or some combination thereof. Although illustrated in FIG. 5 as a single memory, memory 504 may comprise a plurality of memory components. The plurality of memory components may be embodied on a single computing device or distributed across a plurality of computing devices. In various embodiments, memory 504 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 504 may be configured to store information, data (including analytics data), applications, instructions, or the like for enabling circuitry 500 to carry out various functions in accordance with example embodiments of the present invention. For example, in at least some embodiments, memory 504 is configured to buffer input data for processing by processor 502. Additionally or alternatively, in at least some embodiments, memory 504 is configured to store program instructions for execution by processor 502. Memory 504 may store information in the form of static and/or dynamic information. This stored information may be stored and/or used by circuitry 500 during the course of performing its functionalities.

Communications module 506 may be embodied as any device or means embodied in circuitry, hardware, a computer program product comprising computer readable program instructions stored on a computer readable medium (e.g., memory 504) and executed by a processing device (e.g., processor 502), or a combination thereof that is configured to receive and/or transmit data from/to another device, such as, for example, a second circuitry 500 and/or the like. In some embodiments, communications module 506 (like other components discussed herein) can be at least partially embodied as or otherwise controlled by processor 502. In this regard, communications module 506 may be in communication with processor 502, such as via a bus. Communications module 506 may include, for example, an antenna, a transmitter, a receiver, a transceiver, network interface card and/or supporting hardware and/or firmware/software for enabling communications with another computing device. Communications module 506 may be configured to receive and/or transmit any data that may be stored by memory 504 using any protocol that may be used for communications between computing devices. Communications module 506 may additionally or alternatively be in communication with the memory 504, input/output module 508 and/or any other component of circuitry 500, such as via a bus.

Input/output module 508 may be in communication with processor 502 to receive an indication of a user input and/or to provide an audible, visual, mechanical, or other output to a user. Some example visual outputs that may be provided to a user by circuitry 500 are discussed in connection with FIGS. 2-3. As such, input/output module 508 may include support, for example, for a keyboard, a mouse, a joystick, a display, a touch screen display, a microphone, a speaker, a RFID reader, barcode reader, biometric scanner, and/or other input/output mechanisms. In embodiments wherein circuitry 500 is embodied as a server or database, aspects of input/output module 508 may be reduced as compared to embodiments where circuitry 500 is implemented as an end-user machine or other type of device designed for complex user interactions. In some embodiments (like other components discussed herein), input/output module 508 may even be eliminated from circuitry 500. Alternatively, such as in embodiments wherein circuitry 500 is embodied as a server or database, at least some aspects of input/output module 508 may be embodied on an apparatus used by a user that is in communication with circuitry 500, such as for example, pharmacy terminal 108. Input/output module 508 may be in communication with the memory 504, communications module 506, and/or any other component(s), such as via a bus. Although more than one input/output module and/or other component can be included in circuitry 500, only one is shown in FIG. 5 to avoid overcomplicating the drawing (like the other components discussed herein).

Data set optimizer module 510 may also or instead be included and configured to perform the functionality discussed herein related to the dynamic data quality assessment discussed above. In some embodiments, some or all of the functionality of dynamic data quality assessment may be performed by processor 502. In this regard, the example processes and algorithms discussed herein can be performed by at least one processor 502 and/or data set optimizer module 510. For example, non-transitory computer readable media can be configured to store firmware, one or more application programs, and/or other software, which include instructions and other computer-readable program code portions that can be executed to control each processor (e.g., processor 502 and/or data set optimizer module 510) of the components of system 400 to implement various operations, including the examples shown above. As such, a series of computer-readable program code portions are embodied in one or more computer program products and can be used, with a computing device, server, and/or other programmable apparatus, to produce machine-implemented processes.

Any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of dynamic data quality assessment system 100. In some embodiments, one or more external systems (such as a remote cloud computing and/or data storage system) may also be leveraged to provide at least some of the functionality discussed herein.

As described above in this disclosure, aspects of embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program products. It will be understood that each block of the circuit diagrams and process flow diagrams, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as processor 502 and/or data set optimizer module 510 discussed above with reference to FIG. 5, to produce a machine, such that the computer program product includes the instructions which execute on the computer or other programmable data processing apparatus create a means for implementing the functions specified in the flowchart block or blocks.

These computer program instructions may also be stored in a computer-readable storage device (e.g., memory 504) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A computer-implemented method for optimizing data sampling to generate a data set distribution of a set of input data instances, the method comprising:

receiving a data set optimization job, the data set optimization job comprising the set of input data instances having an input range and distribution configuration data describing a first discretization of the data set distribution into a plurality of data bins, wherein the data set optimization job is associated with an input data evaluator, and wherein the first discretization defines, for each data bin of the plurality of data bins, a range of evaluation values, and wherein the first discretization further defines, for each data bin of the plurality of data bins, an associated label, a prediction range, and a size capacity for the data bin, and further wherein the associated label for each data bin identifies any of the set of input data instances that are associated with the data bin; and determining whether to update the data set distribution by performing operations comprising, for each input data instance of the set of input data instances:

generating an instance evaluation of the input data instance;

for each data bin of the plurality of data bins, generating an evaluation determination, wherein the evaluation determination for each data bin indicates whether to offer the input data instance to the data bin;

for each offered data bin of the plurality of data bins whose evaluation determination indicates offering of the input data instance to the data bin, generating an update determination for the offered data bin based on the range of evaluation values associated with the offered data bin and the instance evaluation of the input data instance, wherein the update determination for each offered data bin indicates whether to associate the input data instance with the offered data bin; and for each associated data bin being an offered data bin of the plurality of data bins whose update determination indicates associating the input data instance to the associated data bin, updating the associated label of the associated data bin.

2. The method of claim 1, wherein each instance evaluation for an input data instance of the set of data instances indicates an evaluation value for the first input data instance, and wherein determining whether to associate a first input data instance of the set of input data instances with a first data bin of the plurality of data bins comprises:
  determining whether the evaluation value of the first input data instance is within the evaluation range associated with the first data bin.

3. The method of claim 1, wherein determining whether to offer the first input data instance of the set of input data instances to a first data bin of the plurality of data bins comprises determining whether the bin size capacity for the first data bin is satisfied.

4. The method of claim 1, wherein the input data evaluator is a predictive model, and wherein generating the instance evaluation for an input data instance of the set of input data instances comprises:
  generating a model prediction for the input data instance by processing the input data instance using the predictive model.

5. The method of claim 4, wherein determining whether to associate the first input data instance of the set of input data instances with a first data bin of the plurality of data bins comprises:
  determining whether the model prediction for the first input data instance is within the prediction range associated with the first data bin.

6. The method of claim 1, wherein the first input data instance of the set of data instances is a pair of the entity references, and the instance evaluation for the first input data instance is a label representing whether the pair of the entity references match.

7. The method of claim 6, wherein the set of input data instances is generated by preprocessing a set of entity references, the preprocessing comprising:
  identifying a subset of possible pairs of the entity references for comparison.

8. The method of claim 7, wherein the preprocessing further comprises:
  generating a grouping function;
  partitioning the entity references into a set of groups using the grouping function;
  calculating the proportion of references that exist in each group; and
  identifying a subset of possible pairs of the entity references for comparison by selecting pairs of references from each group based in part on the calculated proportion.

9. The method of claim 8, wherein the set of entity references describes geospatial data, wherein each of the groups represents a particular location region, and wherein partitioning the entity references into a set of groups using the grouping function comprises:
  grouping the entity references based on geographical data including at least one of latitude/longitude, city, and postal code.

10. The method of claim 1, wherein the instance evaluation for the first input data instance is an anomaly score generated using an anomaly scorer.

11. The method of claim 1, wherein the set of input data instances is received from a data stream.

12. The method of claim 11, wherein the data stream is generated from online data.

13. A computer program product, stored on a non-transitory computer readable medium, comprising instructions that when executed on one or more computers cause the one or more computers to perform operations for optimizing data sampling to generate a data set distribution of a set of input data instances, the operations comprising:
  receiving a data set optimization job, the data set optimization job comprising the set of input data instances having an input range and distribution configuration data describing a first discretization of the data set distribution, into a plurality of data bins, wherein the data set optimization job is associated with an input data evaluator, and wherein the first discretization defines, for each data bin of the plurality of data bins, a range of evaluation values, and wherein the first discretization further defines, for each data bin of the plurality of data bins, one or more evaluation criteria and an associated label, a prediction range, and a size capacity for the data bin, and further wherein the associated label for each data bin identifies any of the set of input data instances that are associated with the data bin; and determining whether to update the data set distribution by performing operations comprising for each input data instance of the set of input data instances:
  generating an instance evaluation of the input data instance;
  for each data bin of the plurality of data bins, generating an evaluation determination, wherein the evaluation determination for each data bin indicates whether to offer the input data instance to the data bin;
  for each offered data bin of the plurality of data bins whose evaluation determination indicates offering of the input data instance to the data bin, generating an update determination for the offered data bin based on the range of evaluation values associated with the offered data bin and the instance evaluation of the input data instance, wherein the update determination for each offered data bin indicates whether to associate the input data instance with the offered data bin; and
  for each associated data bin being an offered data bin of the plurality of data bins whose update determination indicates associating the input data instance to the associated data bin, updating the associated label of the associated data bin in an instance.

14. The computer program product of claim 13, wherein each instance evaluation for an input data instance of the set of data instances indicates an evaluation value for the first input data instance, and wherein determining whether to associate a first input data instance of the set of input data instances with a first data bin of the plurality of data bins comprises:
  determining whether the evaluation value of the first input data instance is within the evaluation range associated with the first data bin.

15. The computer program product of claim 14, wherein determining whether to offer the first input data instance of the set of input data instances to a first data bin of the plurality of data bins comprises whether the bin size capacity for the first data bin is satisfied.

16. The computer program product of claim 15, wherein the input data evaluator is a predictive model, and wherein generating the instance evaluation for an input data instance of the set of input data instances comprises:
  generating a model prediction for the input data instance by processing the input data instance using the predictive model.

17. The computer program product of claim 16, wherein determining whether to associate the first input data instance of the set of input data instances with a first data bin of the plurality of data bins comprises:

determining whether the model prediction for the first input data instance is within the prediction range associated with the first data bin.

18. The computer program product of claim 13, wherein a first input data instance of the set of input data instances is a pair of the entity references, and the instance evaluation for the first input data instance is a label representing whether the pair of the entity references match.

19. The computer program product of claim 18, wherein the set of input data instances is generated by preprocessing a set of entity references, the preprocessing comprising:
   identifying a subset of possible pairs of the entity references for comparison.

20. The computer program product of claim 19, wherein the preprocessing further comprises:
   generating a grouping function;
   partitioning the entity references into a set of groups using the grouping function;
   calculating the proportion of references that exist in each group; and
   identifying a subset of possible pairs of the entity references for comparison by selecting pairs of references from each group based in part on the calculated proportion.

21. The computer program product of claim 20, wherein the set of entity references describes geospatial data, wherein each of the groups represents a particular location region, and wherein partitioning the entity references into a set of groups using the grouping function comprises:
   grouping the entity references based on geographical data including at least one of latitude/longitude, city, and postal code.

22. The computer program product of claim 13, wherein the instance evaluation for the first input data instance is an anomaly score generated using an anomaly scorer.

23. The computer program product of claim 13, wherein the set of input data instances is received from a data stream.

24. The computer program product of claim 23, wherein the data stream is generated from online data.

25. A system comprising:
   one or more computers and one or more storage devices storing instructions that are operable, when executed by the one or more computers, to cause the one or more computers to perform operations for optimizing data sampling to generate a data set distribution of a set of input data instances, the operations comprising:
   receiving a data set optimization job, the data set optimization job comprising the set of input data instances having an input range and distribution configuration data describing a first discretization of into a plurality of data bins, wherein the data set optimization job is associated with an input data evaluator, and wherein the first discretization defines, for each data bin of the plurality of data bins, a range of evaluation values, and wherein the first discretization further defines, for each data bin of the plurality of data bins, an associated label, a prediction range, and a size capacity for the data bin, and further wherein the associated label for each data bin identifies any of the set of input data instances that are associated with the data bin; and
   determining whether to update the data set distribution by performing operations comprising, for each of the input data instances
   generating an instance evaluation of the input data instance;
   for each data bin of the plurality of data bins, generating an evaluation determination, wherein the evaluation determination for each data bin indicates whether to offer the input data instance to the data bin;
   for each offered data bin of the plurality of data bins whose evaluation determination indicates offering of the input data instance to the data bin, generating an update determination for the offered data bin based on the range of evaluation values associated with the offered data bin and the instance evaluation of the input data instance, wherein the update determination for each offered data bin indicates whether to associate the input data instance with the data bin; and
   for each associated data bin being an offered data bin of the plurality of data bins whose update determination indicates associating the input data instance to the associated data bin, updating the associated label of the associated data bin.

26. The system of claim 25, wherein each instance evaluation for an input data instance of the set of data instances indicates an evaluation value for the first input data instance, and wherein determining whether to associate a first input data instance of the set of input data instances with a first data bin of the plurality of data bins comprises:
   determining whether the evaluation value of the first input data instance is within the evaluation range associated with the first data bin.

27. The system of claim 26, wherein determining whether to offer the first input data instance of the set of data instances to a first data bin of the plurality of data bins comprises determining whether the bin size capacity for the first data bin is satisfied.

28. The system of claim 27, wherein the input data evaluator is a predictive model, and wherein generating the instance evaluation for an input data instance of the set of input data instances comprises:
   generating a model prediction for the first input data instance by processing the first input data instance using the predictive model.

29. The system of claim 28, wherein determining whether to associate the first input data instance of the set of input data instances with a first offered data bin of the plurality of data bins comprises:
   determining whether the model prediction for the first input data instance is within the prediction range associated with the first data bin.

30. The system of claim 25, wherein the first input data instance of the set of input data instances is a pair of the entity references, and the instance evaluation for the first input data instance is a label representing whether the pair of the entity references match.

31. The system of claim 30, wherein the set of input data instances is generated by preprocessing a set of entity references, the preprocessing comprising:
   identifying a subset of possible pairs of the entity references for comparison.

32. The system of claim 31, wherein the preprocessing further comprises:
   generating a grouping function;
   partitioning the entity references into a set of groups using the grouping function;
   calculating the proportion of references that exist in each group; and
   identifying a subset of possible pairs of the entity references for comparison by selecting pairs of references from each group based in part on the calculated proportion.

33. The system of claim 32, wherein the set of entity references describes geospatial data, wherein each of the groups represents a particular location region, and wherein partitioning the entity references into a set of groups using the grouping function comprises:

grouping the entity references based on geographical data including at least one of latitude/longitude, city, and postal code.

34. The system of claim 25, the instance evaluation for the first input data instance is an anomaly score generated using an anomaly scorer.

35. The system of claim 25, wherein the set of input data instances is received from a data stream.

36. The system of claim 35, wherein the data stream is generated from online data.

* * * * *